UNITED STATES PATENT OFFICE.

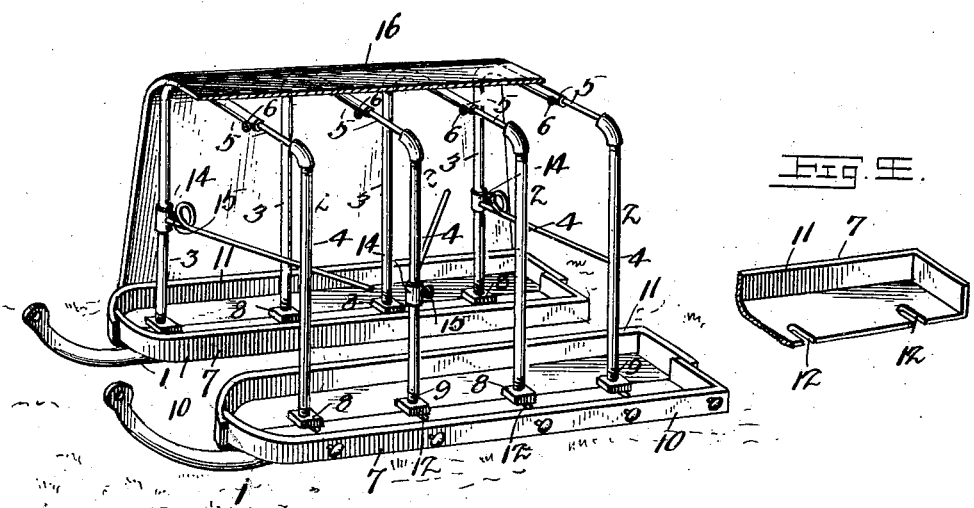

OWEN M. MAUPIN, OF ROCKDALE, TEXAS, ASSIGNOR OF ONE-HALF TO JAMES H. HOLTZCLAW, OF ROCKDALE, TEXAS.

MACHINE FOR CATCHING INSECTS.

SPECIFICATION forming part of Letters Patent No. 685,285, dated October 29, 1901.

Application filed July 5, 1901. Serial No. 67,198. (No model.)

*To all whom it may concern:*

Be it known that I, OWEN M. MAUPIN, a citizen of the United States, residing at Rockdale, in the county of Milam and State of Texas, have invented a new and useful Machine for Catching Insects, of which the following is a specification.

My invention is an improved machine for catching insects, and is particularly adapted for ridding growing crops, as cotton or potatoes, of insect pests, such as the cotton-boll weevil and the Colorado beetle; and it consists in the peculiar construction and combination of devices hereinafter fully set forth and claimed.

In the accompanying drawings, Figure 1 is a perspective view of an insect-catching machine embodying my improvements, a portion of the covering-hood being removed. Fig. 2 is a vertical longitudinal sectional view of the same. Fig. 3 is a vertical transverse sectional view of the same. Fig. 4 is a detail perspective view of a portion of one of the sections of the pans.

In the embodiment of my invention I provide a frame which comprises a pair of runners 1, arranged at a suitable distance apart and connected together by arch-frames 2. Preferably the runners are made of pieces of metal pipe, and the arch-frames are also made of metal tubing. Each of the arch-frames is made of two sections 3 4, which are provided with a telescopic connection 5 and with a suitable set-screw 6, whereby the space between the runners may be widened or narrowed, as may be required by the width of the spaces between the rows of plants. On the vertical standards of the arched frames 2 are longitudinally-disposed pans 7. The said vertical standards of the arch-frames pass through openings in the said pans, and the latter are supported at any desired vertical adjustment on the said vertical standards of said arch-frames by nuts 8, which operate on threaded portions of the said standards, as at 9. Preferably each of the pans is formed of two sections 10 11, the opposing sides of which overlap each other, whereby each pan may be widened or narrowed, as may be desired, and the openings 12 in the said pan-sections, through which the vertical standards of the arch-frames extend, are elongated, as at 12, to admit of the lateral adjustment of the said sections of the pan. The pans are preferably made of iron or other suitable metal. I also employ a suitable number of spring knocker-bars 13, which are connected to the vertical standards of the arch-frames or certain of them by sleeves 14, which are vertically adjustable on said standards of said arch-frames and are provided with set-screws 15, by which they may be clamped and secured at any desired vertical adjustment. The said spring knocker-bars extend transversely over the space between the pans.

A hood or cover 16, which may be of any suitable material, is placed over the arch-frames and secured to the sides of the pans either by means here shown or by any other suitable means.

Fires may be maintained in the pans or any suitable poisonous compound or liquid may be placed therein.

In operation my improved machine is drawn along astride of a row of growing plants. The spring knocker-bars, having been adjusted appropriately to the height of the plants, serve as they pass the plants to shake the same and dislodge the insects therefrom, the insects falling in the pans and being therein destroyed by the fires, poisonous compounds, or liquids therein contained for that purpose.

Within the scope of my invention the runners may be formed integrally with the pans and other modifications may be made. I do not therefore desire to limit myself to the precise construction and combination of devices hereinbefore described.

The arch-frames which connect the pans together are independent of each other and not connected otherwise than to the pans, and said arch-frames are flexible to a considerable extent, with the result that the pans, when the machine is in motion, will be jarred or vibrated, thus rendering it difficult for insects to crawl out of the same.

Having thus described my invention, I claim—

1. An insect-destroying machine of the class described, having pans and arch-frames connecting the said pans, whereby the machine may be drawn along a row of plants and astride of the same, and knockers to dislodge the insects from the plants, said arch-frames being disconnected from each other, substantially as described.

2. An insect-destroying machine of the class described having pans connected together by laterally-adjustable arch-frames disconnected from each other and knocker-bars attached to the said arch-frames, substantially as described.

3. In an insect-destroying machine, the combination of pans, arch-frames connecting the said pans together and disconnected from each other, whereby the machine is adapted to be drawn astride of a row of plants and spring knocker-bars attached to said arch-frames, substantially as described.

4. In an insect-destroying machine, the combination of pans, arch-frames connecting the said pans together and disconnected from each other, whereby the machine is adapted to be drawn astride of a row of plants and spring knocker-bars attached to and vertically adjustable on said arch-frames, substantially as described.

5. In an insect-destroying machine, the combination of pans and arch-frames connecting said pans together, each of the said pans comprising a pair of longitudinal laterally-adjustable sections, substantially as described.

6. In a machine of the class described, the combination of arch-frames and pans on said arch-frames, said pans having overlapping sections provided with elongated openings through which said arch-frames extend and means to clamp said pan-sections together, and to said arch-frames, substantially as described.

7. An insect-destroying machine of the class described, comprising runners, arch-frames attached to and connecting the said runners, pans attached to the vertical portions of said arch-frames, and knockers attached to said vertical portions of said arch-frames and extending transversely over said pans and the space between them, substantially as described.

8. An insect-destroying machine of the class described, having laterally-adjustable arch-frames, pans attached to said arch-frames, whereby the space between said pans may be widened or narrowed, and transversely-disposed knocker-bars, substantially as described.

9. In an insect-destroying machine, of the class described, a plurality of pans, and a series of flexible independent arch-frames connecting said pans, substantially as described.

10. An insect-destroying machine of the class described having laterally-adjustable arch-frames composed of sections telescopically fitted together and knocker-bars secured to said arch-frames, substantially as described.

In testimony that I claim the foregoing as my own I have hereto affixed my signature in the presence of two witnesses.

OWEN M. MAUPIN.

Witnesses:
 GUS NEWTON,
 R. L. HALE.